Dec. 10, 1940.    J. SCHLEYER    2,224,409
COFFEE FILTER FOR INDIVIDUAL PERCOLATORS
Filed Nov. 26, 1938
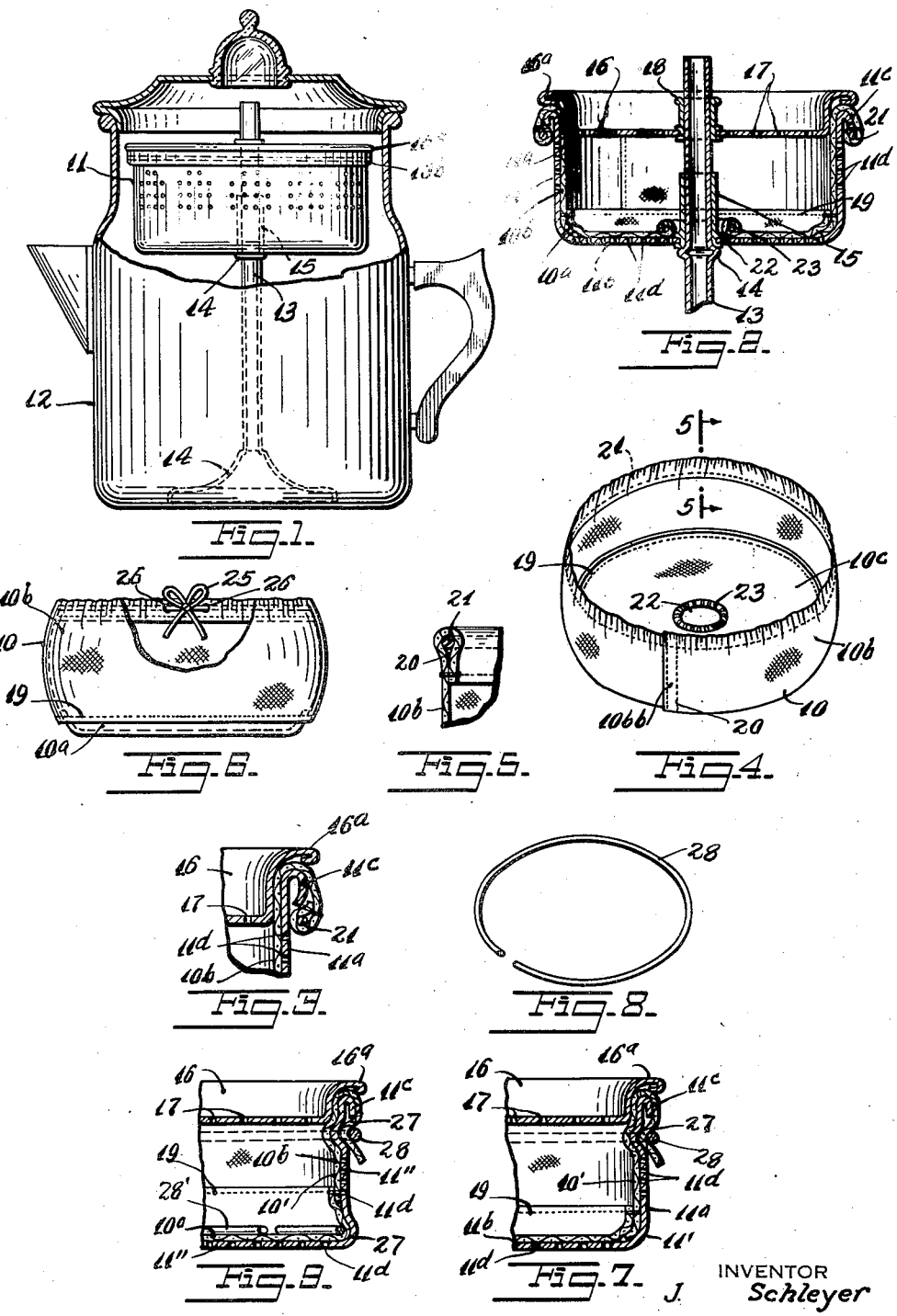
INVENTOR
J. Schleyer
ATTORNEY Patented Dec. 10, 1940

2,224,409

UNITED STATES PATENT OFFICE 2,224,409

COFFEE FILTER FOR INDIVIDUAL PERCOLATORS

Jack Schleyer, New York, N. Y.

Application November 26, 1938, Serial No. 242,517

2 Claims. (Cl. 53—3)

This invention relates to new and useful improvements in a coffee filter for individual percolators.

The invention has for an object the construction of a filter which is characterized by a filter body adapted to engage in the cup of a coffee percolator and having a bottom wall for extending across the bottom wall of the cup and a side wall for extending across the side walls of the cup.

Still further the invention proposes to characterize the filter body by the fact that the bottom wall is formed with an opening for the percolator tube to pass through.

Another object of this invention resides in constructing the filter body with the top edge of the side wall provided with a hem for engaging over the top edge of the cup, and it is proposed to arrange an elastic band within the hem for resiliently holding the filter body upon the cup.

Still further the invention contemplates various modifications of the device.

For further comprehension of the invention and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a percolator provided with a coffee filter according to this invention, a portion of the figure being broken away to illustrate interior parts.

Fig. 2 is a fragmentary vertical sectional view of a portion of Fig. 1 showing particularly the percolator cup.

Fig. 3 is an enlarged detailed view of one of the corners of Fig. 2.

Fig. 4 is a perspective view of the filter body per se.

Fig. 5 is a fragmentary sectional view taken on the line 5—5 of Fig. 4.

Fig. 6 is a side elevational view of a filter constructed according to a modification of this invention, a portion thereof being broken away to disclose interior parts.

Fig. 7 is a fragmentary vertical sectional view of a percolator cup and filter body mounted thereon according to a modified form of the invention.

Fig. 8 is a perspective view of a clamp ring used in Fig. 7.

Fig. 9 is a fragmentary vertical sectional view of the percolator cup and filter body constructed according to a still further modification of this invention.

The coffee filter for individual percolators, according to this invention, includes a filter body 10 adapted to engage in the cup 11 of a coffee percolator characterized by a pot 12, a percolator tube 13 extending through the center of the pot, and provided with a bead 14 supporting the cup 11. The lower end of the tube 13 is mounted through the top of a hollow base 14 having an open bottom and resting on the bottom of the pot 12. The percolator cup 11 has its side walls 11$^a$ and its bottom wall 11$^b$ formed with a plurality of perforations 11$^d$. A short length of tube 15 is mounted coaxially upon the bottom wall 11$^b$ of the percolator cup and engages about the percolator tube 13 for assisting in rigidly supporting the cup 11.

The cup 11 is provided with a cover 16 which is formed with a plurality of perforations 17. This cover 16 also has a short length of tube 18 mounted coaxially thereof and engaging about the sides of the percolator tube 13 for assisting in holding the cover in position. At the edges the cover 16 has a flange portion 16$^a$ adapted to rest upon the upper edge of the cup 11. This upper edge of the cup is formed with a coiled portion 11$^c$.

The filter body 10 is formed from a base wall portion 10$^a$ and a side wall portion 10$^b$. These portions have their adjacent edges overlapping (see Fig. 2) and are secured together by a line of stitches 19. The side wall portion 10$^b$ is formed from a strip of material which has its ends 10$^{bb}$ overlapping and secured together by a line of stitches 20. The upper edge of the side wall 10$^b$ is formed with a hem portion which is adapted to engage over the edge 11$^c$ of the percolator cup. An elastic band 21 is engaged within this hem portion and is adapted to securely hold the hem portion beneath the coiled edge 11$^c$. The base wall 10$^a$ of the filter is provided with an opening 22. An elastic band 23 is secured along the edges of this opening and is adapted to resiliently engage against the side wall of the tube 13 for assisting in properly holding the filter body within the percolator cup. This elastic band is preferably made of boilproof material.

The operation of the device is as follows:

The filter body is mounted within the percolator cup as shown on the drawing. The coffee is placed within the filter body and thus within the percolator cup. The water for making the coffee is placed in the pot 12 which is then placed over a flame in the customary manner. The heat will drive the water up through the tube 11 from which it will discharge upon the cover 16 and then pass through the perforations 17 into the filter body 10. The coffee flavor will be extracted into the water which then passes through the filter material of the filter body and through the perforations 11$^d$ of the cup 11 and drips back into the pot 12.

In Fig. 6 a modification of the invention has been disclosed which distinguishes from the prior form in the construction of the top edge of the filter body. According to this form of the invention a cord 25 is laced through the hem 20 and at one point has its ends engaging out from closely spaced openings 26. The ends of the cord 25 are adapted to be drawn and tied together as shown in Fig. 6 for securing the upper edge portion of the filter body upon the percolator cup. It should be noted that the openings 26 are arranged on the inner side of the side wall of the filter body. When this top edge portion of the filter body is bent over the top edge portion of the percolator cup the openings 26 will be disposed on the outside.

In Figs. 7 and 8 another modification of the invention has been disclosed which distinguishes from the prior form in a novel arrangement for securing the top portion of the filter body upon the percolator cup. According to this form of the invention the percolator cup 11' is formed with an encircling groove 27 near the top edge thereof. The filter body 10' has its top edge plain, that is, without a hem portion, and this top edge portion is bent over the top edge of the percolator cup. A clamp ring 28 is then engaged over the bent down top edge portion of the filter body on the same elevation as the groove 27 and so maintains its position. Thus the clamp ring 28 serves to releasably hold the top edge portion of the filter body. In other respects this form of the invention is similar to the previous form.

In Fig. 9 another modified form of the invention is disclosed which distinguishes from the prior form in the fact that the percolator cup 11" is formed with the top groove 27 at a location spaced slightly down from the top edge of the percolator cup, on the outer face thereof, and a bottom groove 27' arranged at the junction of the base wall and the side wall of the percolator cup and upon the inner face of the side wall. An auxiliary clamp ring 28' engages within the filter body 10' and serves to hold the lower portions thereof stretched within the lower portion of the percolator cup.

The top edge portion of the filter body 10' is held by the clamp ring 28. It is possible to tightly stretch the base wall 10$^a$ of the filter body across the clamp ring 28', and it is also possible to tightly stretch the side wall 10$^b$ of the filter body between the clamp rings 28 and 28'. In this manner the filter body will be held tautly stretched and be capable of more efficiently filtering the coffee.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a coffee filter for individual percolators, a filter body adapted to engage in the cup of a coffee percolator and having a bottom wall for extending across the bottom wall of said cup and a side wall for extending across the side walls of said cup, said bottom wall of the filter body having an opening for the percolator tube to pass through, the top edge portion of said side wall being bent over the top edge portion of said percolator cup, and a clamp ring engaged over said bent over portion for holding the same in position, said clamp ring being positioned over an encircling groove formed in the side wall of said percolator cup, and another clamp ring within the filter body at the junction of the bottom wall and side wall for engaging a groove formed in the base portion of the side wall of the percolator cup.

2. In a coffee percolator, a percolator cup comprising a perforated, substantially cylindrical side wall portion and a perforated bottom wall portion, said side wall portion being circumferentially enlarged at the base thereof, a flexible, cup-shaped filter for engagement in said cup, means securing the top of said filter to the top edge of said percolator cup, and expansible circumferential means for mounting inside the lower portion of said filter for expanding the same into the circumferentially enlarged part of said side wall portion for tensioning the filter both vertically and longitudinally.

JACK SCHLEYER.